United States Patent
Kennedy et al.

(10) Patent No.: US 9,957,346 B2
(45) Date of Patent: *May 1, 2018

(54) MELT PROCESSIBLE POLYUREAS AND POLYUREA-URETHANES, METHOD FOR THE PRODUCTION THEREOF AND PRODUCTS MADE THEREFROM

(75) Inventors: Joseph Kennedy, Akron, OH (US); Jungmee Kang, Stow, OH (US); Gabor Erdodi, Stow, OH (US)

(73) Assignee: The University of Akron, Akron, OH (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/001,214

(22) PCT Filed: Feb. 23, 2012

(86) PCT No.: PCT/US2012/026297
§ 371 (c)(1),
(2), (4) Date: Aug. 23, 2013

(87) PCT Pub. No.: WO2012/116164
PCT Pub. Date: Aug. 30, 2012

(65) Prior Publication Data
US 2013/0331538 A1  Dec. 12, 2013

Related U.S. Application Data (60) Provisional application No. 61/445,578, filed on Feb. 23, 2011.

(51) Int. Cl.
| | |
|---|---|
| C08G 18/66 | (2006.01) |
| C08G 18/65 | (2006.01) |
| C08G 18/62 | (2006.01) |
| C08G 18/10 | (2006.01) |
| C08G 18/44 | (2006.01) |
| C08G 18/40 | (2006.01) |
| C08G 18/32 | (2006.01) |
| C08G 18/48 | (2006.01) |
| C08G 18/50 | (2006.01) |
| C08G 18/64 | (2006.01) |
| C08G 18/75 | (2006.01) |
| C08L 75/04 | (2006.01) |

(52) U.S. Cl.
CPC ......... *C08G 18/6651* (2013.01); *C08G 18/10* (2013.01); *C08G 18/3228* (2013.01); *C08G 18/3237* (2013.01); *C08G 18/3275* (2013.01); *C08G 18/4018* (2013.01); *C08G 18/4063* (2013.01); *C08G 18/44* (2013.01); *C08G 18/4854* (2013.01); *C08G 18/5024* (2013.01); *C08G 18/6204* (2013.01); *C08G 18/6415* (2013.01); *C08G 18/6529* (2013.01); *C08G 18/6685* (2013.01); *C08G 18/758* (2013.01); *C08L 75/04* (2013.01)

(58) Field of Classification Search
CPC ................ C08G 18/10; C08G 18/3275; C08G 18/6415; C08G 18/5024; C08G 18/6651; C08G 18/6685; C08G 18/758; C08G 18/3228; C08G 18/3237; C08G 18/4018; C08G 18/4063; C08G 18/4854; C08G 18/6204; C08G 18/44; C08G 18/6529; C08L 75/04

See application file for complete search history.

(56) References Cited

U.S. PATENT DOCUMENTS

| | | | | |
|---|---|---|---|---|
| 4,192,928 A | * | 3/1980 | Tanaka | C08G 18/10 427/246 |
| 5,061,777 A | * | 10/1991 | Yoda | A61L 33/068 528/61 |
| 5,250,649 A | * | 10/1993 | Onwumere | A61L 29/06 528/28 |
| 8,674,034 B2 | * | 3/2014 | Kennedy et al. | 525/460 |
| 2011/0054580 A1 | * | 3/2011 | Desai | A61L 31/06 607/116 |

FOREIGN PATENT DOCUMENTS

WO    2005068528    7/2005

* cited by examiner

*Primary Examiner* — Rabon Sergent
(74) *Attorney, Agent, or Firm* — Renner Kenner Greive Bobak Taylor & Weber (57) ABSTRACT

A polyurea or polyurea-urethane elastomer comprises a soft polymer segment and a hard polymer segment, wherein the hard polymer segment includes polyurea groups in combination with H-bond accepting chain extenders (HACEs) to reduce the flow temperature ($T_{flow}$) while maintaining the excellent mechanical properties such that the resulting polyurea elatomer is rendered melt-processable.

9 Claims, 5 Drawing Sheets

MELT PROCESSIBLE POLYUREAS AND POLYUREA-URETHANES, METHOD FOR THE PRODUCTION THEREOF AND PRODUCTS MADE THEREFROM

CROSS REFERENCE TO RELATED APPLICATIONS

This application claims the benefit of U.S. Provisional Patent Application No. 61/445,578, filed Feb. 23, 2011, the disclosure of which is hereby incorporated by reference.

TECHNICAL FIELD

This invention relates to rendering a thermoplastic elastomer, such as polyurea and polyurea-urethane, melt processable. More particularly, this invention relates to a polyurea or polyurea-urethane elastomer comprising a soft polymer segment and a hard polymer segment, wherein the hard polymer segment includes polyurea groups in combination with H-bond accepting chain extenders (HACEs) to reduce the flow temperature ($T_{flow}$) while maintaining the excellent mechanical properties such that the resulting polyurea elatomer is rendered melt-processable.

BACKGROUND OF THE INVENTION

Conventional and commercially available thermoplastic polyurethanes and polyureas comprise soft/rubbery polymer segments covalently linked to incompatible hard/crystalline that provide physical crosslinks and reinforcement. The ultimate properties of these physically crosslinked networks are primarily due to the nature, overall composition, and morphology of the soft and hard segments. The nature and extent of hydrogen bonding within the hard segments, and between the hard and soft segments, largely determines mechanical properties and proccessability. Thus, polyureas, whose mechanical properties are, as a rule, superior to polyurethanes, have heretofore never been thermally processed (i.e., melt processed) because they contain a variety of strong H-bonds. These bidentate H-bonds between urea groups (e.g., —NHCONH—) degrade before flow even upon moderate heating, say to about 240° C. Hence, conventional polyureas do not melt and will degrade before melting.

As a consequence, all known, conventional polyureas are processed in solution (e.g., by dry spinning) by the use of environmentally unfriendly solvents. One well known example of a polyurea fiber processable only by solution techniques (e.g., dry spinning) using a strongly H-accepting solvent (e.g., dimethylformamide), is the spandex or elastane polyurea fiber available from E.I. du Pont & Nemours & Co. under the trade name Lycra®. Because of the use of solvents such as dimethylformamide, solution proccessability of polyureas is costly, cumbersome, and environmentally unfriendly.

Accordingly, a need exists for thermoplastic elastomers, such as polyureas and polyurea-urethanes, that can maintain their desired excellent mechanical properties, but are not so costly, cumbersome and environmentally unfriendly as those polyureas produced in solution.

Heretofore, attempts have been made to render polyureas melt processable. However, all prior processes undertaken to attain thermal proccessability have called for major changes in the synthesis of the polyurea. For example, one recognized method to attain melt proccessability of polyurea is to eliminate the use of chain extenders (CEs) and drastically reduce the hard segment content (to less than 14%). Reducing the number of chain extenders in the polyurea will reduce the ability of hydrogen to bond to something (e.g., a nucleophilic group) that would prevent the melt processing of the urea. Similarly, at least one patent application (US Patent Application Publication No. 2009/0036598) prepares polyureas by the reaction of polyisocyanates and polyamines with very low hard segment content. However, the lowering of the hard segment content also reduces significantly the mechanical properties of the polyureas, leaving undesirable characteristics.

Even more recently, others have reported melt processable polyureas with slightly higher amounts of hard segments (15-25%) by using branched CEs. Again, however, the branched CEs reduce many, if not all, of the desired mechanical properties, including tensile strength, elongation, Shore A hardness, etc.

Thus, the need exists for a melt processable thermoplastic elastomer having at least 30% hard segment content and exhibiting good mechanical properties.

SUMMARY OF INVENTION

The present invention, together with the advantages thereof over the known art relating to polyureas and thermoplastic elastomers, which shall become apparent from the specification that follows, are accomplished by the invention as hereinafter described and claimed.

In general, the present invention provides a thermoplastic elastomer, such as a polyurea or a polyurea-urethane, comprising at least one soft segment and at least one hard segment. The hard segment comprises at least a plurality of urea groups in combination with an H-bond accepting chain extender having a number average molecular weight of at least 150 g/mol, and more preferably, an H-bond accepting chain extender having a number average molecular weight of between about 150 g/mol and 800 g/mol. Most importantly, the thermoplastic elastomer is melt processable. By "melt processable," it is meant that the flow temperature ($T_{flow}$) of the elastomer has been reduced to where the elastomer will melt or flow, rather than degrade. This temperature is generally below 220° C. In one embodiment, the $T_{flow}$ is less than 200° C. In another embodiment, the $T_{flow}$ is less than 190° C. In yet another embodiment, the $T_{flow}$ is between 170° C. and 210° C.

In another embodiment, the hard segment may include both urea groups and urethane groups (wherein the urethane groups include diisocyanate groups in addition to amine groups) in combination with an H-bond accepting chain extender having a number average molecular weight of at least 150 g/mol, and in another embodiment, at least 180 g/mol. It will be appreciated that the present invention is therefore directed to either polyurea elastomers or polyurea-urethane elastomers, and where polyurea is discussed, polyurea-urethane may be substituted therefore.

The content ratio of hard segment to soft segment of the polyurea or polyurea-urethane elastomer may vary widely with the needs of the producer. If excellent mechanical properties are not as important as melt processing, then the hard segment content can be lower. However, if both are desired, it is believed that the elastomer should have a hard segment content of at least 30% or even at least 35%.

The soft segment of the elastomer is not significant to this invention, as the melt proccessability and mechanical properties desired are substantially the result of the hard segment. Nevertheless, essentially any composition known and suitable for use as the soft, rubbery component of the elastomer may be used provided the component can be linked to the incompatible hard crystalline segments. Typically, such components are of higher molecular weight than those components found in the hard segment. For instance, the soft segment may comprise at least one moiety selected from the group consisting of polyisobutylenes, polyethers, and combinations thereof and macrodiols and macrodiamines of polyisobutylenes, polyethers, and combinations thereof. Examples those soft segments tested in for this invention included, but should not necessarily be limited to, polyisobutylene (PIB) and poly(tetramethylene oxide) (PTMO).

The H-bond accepting chain extenders contained with the hard segment of the elastomer in combination with the urea groups provides for the improvement in melt processibility of the elastomer. H-bond accepting chain extenders, also referred to herein as HACEs, are similar to conventionally known chain extenders (also referred to as CEs), but are generally provided with a higher number average molecular weight (of at least 150 g/mol, and more preferably, at least 180 g/mol) than are conventional chain extenders, due mainly to the fact that they contain more nucleophilic groups, such as those groups containing 0, N, and S (i.e., groups that readily react with positively-charged hydrogen). Examples of HACEs may be a carbonate group or an ether group with a significant number of nucleophilic groups, and many more than found in conventional chain extenders, such as ethylene glycol. Thus, while conventional CEs merely lengthen the hard segments, HACEs are dual purpose CEs that not only lengthen, but also flexibilize the hard segments and reduce the $T_{flow}$ of the elastomer.

Conventional chain extenders are very low molecular weight compounds (having a number average molecular weight of less than 150 g/mol) and serve an important role is the production of polyureas and polyurea-urethanes, as discussed below. However, because they do not include a sufficient number of nucleophilic groups, they do not have the ability to reduce the $T_{flow}$ of the elastomer by themselves. Examples of chain extenders include aliphatic diols, aromatic diols, a combination of aliphatic and aromatic diols, aliphatic diamines, aromatic diamines and a combination of aliphatic and aromatic diamines.

When used conventionally in the formation of polyureas or polyurethanes, the hard segments formed from urea, isocyanate or amine groups and including conventional chain extenders (i.e., without HACEs), are stiff and immobile. Because the hard segments are covalently coupled to the soft segments, they inhibit plastic flow of the polymer chains, thus creating elastomeric resiliency. Upon mechanical deformation, a portion of the soft segments are stressed by uncoiling, and the hard segments become aligned in the stress direction. This reorientation of the hard segments and consequent powerful hydrogen bonding contributes to high tensile strength, elongation, and tear resistance of the elastomers. However, such polyurea elastomers are not melt processable.

Conventional chain extenders can therefore be differentiated from H-bond accepting chain extenders by the number of nucleophilic groups present within the chain extender. One example of a common conventional chain extender is ethylene glycol. Others CEs suitable for use in the present invention would include, not is not necessarily limited to, 1,4 butane diol, 1,6-hexane diol, cyclohexane dimethanol and hydroquinone bis(2-hydroxyethyl) ether. All of these polyols may aid in the formation of polyureas or polyurea-urethanes that phase separate well and form well defined hard segment domains. With the addition of at least 2 percent HACEs, preferably at least 3% HACEs and more preferably, from 3 to 15% HACEs, thereby providing significant additional nucleophilic groups, the benefit to the elastomers is that they become melt processable without compromising their mechanical properties.

Finally, it will be appreciated that the terms "polyurea" and "polyurea-urethane" are misnomers, and may be confusing. They are misnomers because, unlike other homopolymers, there are no single repeating units for this polymer, and beyond that, they can refer to two different components or compositions in the invention. That is, on one hand, polyurea can mean the thermoplastic elastomer itself, as a whole. There is no such thing as a copolymer of polyurea in conventional nomenclature. Instead, it is a polyurea. For purposes of clarity, the terms "polyurea" or "polyurea-urethane," when used in this context, may be referred to as "polyurea elastomers" or "polyurea-urethane elastomers." On the other hand, polyurea or polyurea-urethane can also refer to the plurality of urea groups, or urea and urethane groups, making up a significant portion of the hard segment of the elastomers. For purpose of clarity, the terms "polyurea" or polyurea-urethane," when used in this context, may be referred to as "polyurea groups" or "polyurea-urethane groups." Where only polyurea or polyurea-urethane is used, it is believed the context is clear.

Advantageously, the present invention renders polyurea elastomers and polyurea-urethane elastomers that are melt processable with heretofore unattainable desirable mechanical properties similar to those polyureas and polyurea-urethanes produced by alternative solution processes, such as dry spinning.

DETAILED DESCRIPTION OF THE INVENTION

As noted hereinabove, the present invention seeks to render polyureas or polyurea-urethanes melt processable. Polyurea can be melt processed only if its flow temperature ($T_{flow}$) is reduced sufficiently so that it can flow (i.e., melt) at a temperature lower than the temperature at which it would degrade. As noted above, conventional polyurea degrades at about 240° C., and since the $T_{flow}$ of conventional polyurea is above that temperature, conventional polyurea does not melt.

In the present invention, polyurea and polyurea-urethane elastomers have been prepared by the use of conventional chain extenders (CEs) in combination with H-accepting chain extenders (HACEs). In one embodiment, at least 2 percent HACEs are preferably employed. In other embodiments, at least 3 percent is employed. In other embodiments, at least 6 percent is employed. In yet other embodiments, amounts up to 15 percent or more HACEs are used, where larger amounts of HACEs are needed to provide flexibility to the hard segments. HACEs have more nucleophilic groups than CEs, can for purposes of this invention, the HACEs used have more nucleophilic groups than found in ethylene glycol, a known conventional chain extender. In one embodiment, less than 10 percent of commercially available polycarbonate- and polyether-based HACEs were used in conjunction with at least urea groups and optionally, urethane groups, to produce polyurea elastomers or polyurea-urethane elastomers, respectively.

In detailed embodiments depicted in this description, the present invention provides for the synthesis of conventional (no HACE) poly(tetramethylene oxide) (PTMO)-based polyurea-urethanes, novel (HACE-containing) PTMO-based polyurea-urethanes, and novel (HACE-containing) polyisobutylene (PIB)-based polyurea-urethanes, the novel compositions exhibiting flow temperatures below 200° C. ($T_{flow} \approx 180°$ C.), while maintaining excellent mechanical properties. Stated differently, in the preparation of the polyureas and polyurea-urethanes the present invention, the combination of CEs and HACEs produce H-bonding of sufficient strength for good mechanical properties together with increased hard segment mobility for melt processing.

In order to demonstrate practice of the invention, various polyureas were synthesized. The following detailed description provides one possible embodiment of the present invention and should not be seen as limited the scope of the invention to the particular components recited therein, the scope of the invention be determined and limited by the claims which follow.

The present invention employed the following materials in the synthesis of the polyureas and polyurea-urethanes of the present invention (and the controls). Amine-telechelic poly(tetramethylene oxide) ($H_2N$-PTMO-$NH_2$) of Mn=1,100 g/mol was obtained. Hydroxyl-telechelic PTMO of Mn=650 (referred to herein as $BG_9$) was obtained. Poly(ethylene glycol) of Mn=400 (referred to herein as $EG_9$) was obtained. 1,4-hexane diol (HDO), 1,6-hexamethylene diamine (HDA), bis(4-isocyanatocyclohexyl)methane (HMDI), and dibutyltin dilaurate (DBTDL) were purchased from Aldrich and used without further purification. Reagent grade tetrahydrofuran (THF) was purchased form Fisher Chemicals and was freshly distilled before use. Hydroxyl-telechelic poly(hexamethylene carbonate) mixed with hydroxyl-telechelic poly(pentamethylene carbonate), 50 mol %, of Mn=800 and 500 (HO—PC—OH), was kindly provided by Chori America, Inc. (Jersey City, N.J.). Amine telechelic PIB ($H_2N$-PIB-$NH_2$) of Mn-3,500 g/mol was prepared by a well-established method known in the art.

Polyureas and polyurea-urethanes (prepared by using amine-telechelic polyols and chain extenders, and hydroxyl-telechelic HACEs, i.e., $BG_9$ and PC) were synthesized by a two-step pre-polymer method. Representative synthetic procedures follow.

For the synthesis of PTMO-based polylureas (Control Sample C-3 in Table I), $H_2N$-PTMO-$NH_2$ (1 g, 0.91 mmol) was dissolved in 3 mL THF in a 20 mL vial equipped with a magnetic stirrer. HMDI (0.462 g, 1.76 mmol) was dissolved in 1.5 mL THF and was added to the solution and stirred at room temperature for 5 minutes to obtain the prepolymer. HDA (0.08 g, 0.691 mmol) was dissolved in 3 mL THF and was added to the prepolymer solution. The system was then stirred for 30 minutes. Progress and completion of the reaction was monitored by IR spectroscopy (disappearance of NCO peaks at 2270 cm$^{-1}$). The solution was then poured into a 7.5 cm×7.5 cm Teflon mold, the solvent was evaporated in air and the sample dried at 70° C. in a convection oven and 40° C. in a vacuum oven, until constant weight. The other samples of PTMO-based (No HACE) polyureas were similarly produced.

For the synthesis of PTMO-based, HACE-containing polyurea-urethanes, $H_2N$-PTMO-$NH_2$ was dissolved in 3 mL THF in a 20 mL vial equipped with a magnetic stirrer. HMDI was dissolved in THF and was added to the prepolymer solution. The system was then stirred at room temperature for 5 minutes. Subsequently, HDA and OH—PC—OH, were added dropwise, DBTDL catalyst was added, and the system was stirred at 60° C. for 3 hours to complete the reaction. Progress and completion of the synthesis was monitored by IR spectroscopy (disappearance of NCO peaks at 2270 cm$^{-1}$). The solution was poured into a 7.5 cm×7.5 cm Teflon mold. The solvent was evaporated in air, and the sample was dried at 70° C. in a convection oven. The sample was dried until constant weight in a vacuum oven at room temperature. The dried sample was stored at 4° C. for a week in a refrigerator, to accelerate the formation of hydrogen bonds in the HACE-containing hard segment. Samples were stored at room temperature in a vacuum oven until characterization.

For the synthesis of PIB-based, HACE-containing polyurea-urethanes (Sample PIB-4 in Table I), $H_2N$-PIB-$NH_2$ (1 g, 0.286 mmol), and dissolved in 3 mL THF in a 20 mL vial equipped with a magnetic stirrer. HMDI (0.216 g, 0.823 mmol) was dissolved in 3 mL THF and added to the solution and stirred for 30 minutes to obtain the prepolymer. HDA (0.018 g, 0.154 mmol) and $BG_9$ (0.201 g, 0.309 mmol) dissolved in 3 mL THF and three drops of DBTDL (~0.03 g) were added to the prepolymer solution. The system was stirred at 60° C. for 3 hours. Progress and completion of the synthesis was monitored by IR spectroscopy (disappearance of NCO peaks at 2270 cm$^{-1}$). The solution was poured into a 7.5 cm×7.5 cm Teflon mold. The solvent was evaporated in air, and the sample was dried at 70° C. in a convection oven. The sample was dried until constant weight in a vacuum oven at room temperature. The dried sample was stored at 4° C. for a week in a refrigerator, to accelerate the formation of hydrogen bonds in the HACE-containing hard segment. Samples were stored at room temperature in a vacuum oven until characterization. The other samples of PIB-based, HACE-containing polyurea-urethanes were similarly synthesized.

Figure 1:
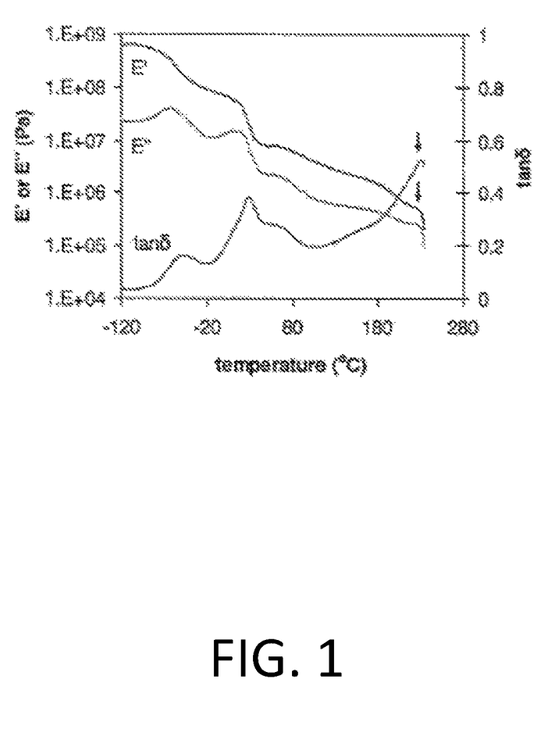
FIG. 1 is a representative DMTA trace of a poly(tetramethylene oxide)-based polyurea, wherein the arrows indicate $T_{flow}$.

Melt proccessability was assessed in terms of flow temperature ($T_{flow}$) determined by dynamic mechanical thermal analysis (DMTA) using a PerkinElmer dynamic mechanical analyzer. Measurements were made in tensile mode at 1 Hz, between −120° C. and 250° C., under a nitrogen atmosphere, at 3° C./minute heating rate. FIG. 1 shows storage modulus (E'), loss modulus (E"), and tan δ together with $T_{flow}$ of a representative PTMO-based polyurea.

Shore Durometer Hardness (Shore A) was determined by using approximately 5 mm thick films by a Micro-O-Ring Hardness Tester, Model 714 by Instron of the three determinations reported.

Stress-strain behavior was determined by an Instron Model 5543 Universal Tester controlled by Series Merlin 3.11 software. A bench-top die (ASTM 1708) was used to cut dog-bones from ~0.25 mm thick films. Samples (25 mm long, 3.18 mm width at the neck) were tested to failure at a crosshead speed of 25 mm/min at room temperature. Averages of two or three determinations are reported.

Thermal gravimetric analysis (TGA) was used to obtain degradation temperatures of ~6 mg samples by using a TA Instruments Q500 Series, at 10° C./minute heating rate to 450° C. in air (60 mL/minute).

Figure 2:
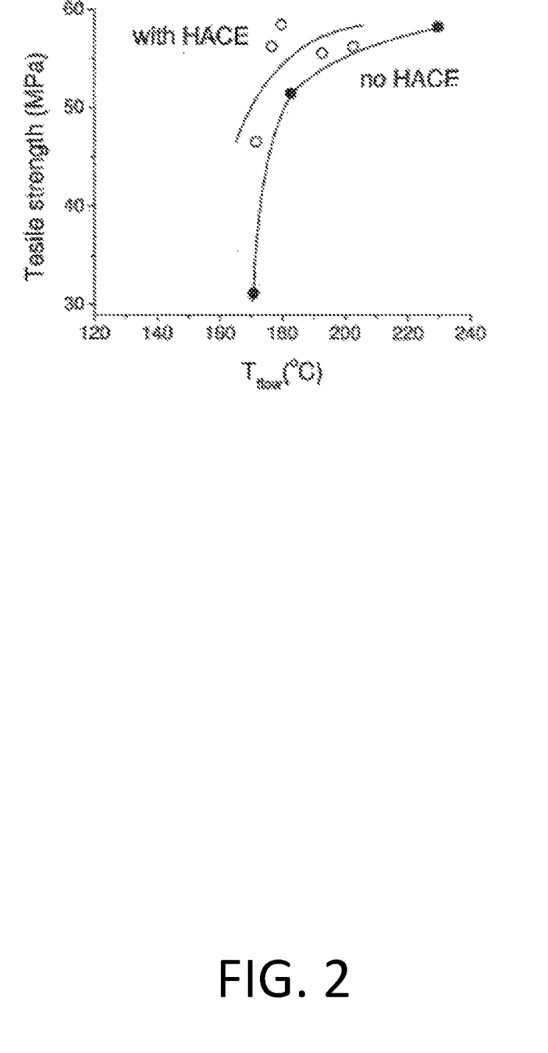
FIG. 2 is a graph of tensile strength versus $T_{flow}$ of conventional (no HACE) poly(tetramethylene oxide)-based polyureas and HACE-containing polyurea-urethanes, wherein a significant shift left indicates lower $T_{flow}$s of the HACE-containing products.
Figure 3A:
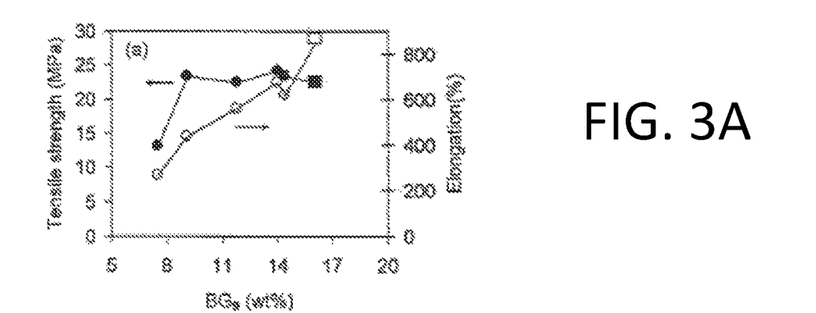
FIG. 3A is a graph of the effect of $BG_9$ concentration on mechanical properties, including tensile strength and elongation.
Figure 3B:
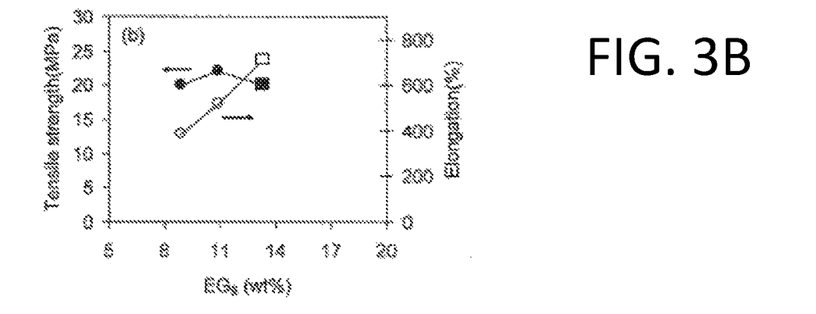
FIG. 3B is a graph of the effect of $EG_9$ concentration on mechanical properties, including tensile strength and elongation.

In light of the foregoing tests and as best shown in Tables I and II and FIGS. 2, 3A and 3B, it will be appreciated that melt processable polyureas can be obtained by combinations of CEs and HACEs used in combination with the requisite polyurea groups and optionally, polyurethane groups. In the first series shown in Table I, conventional PTMO-based polyureas were prepared. The effect of the addition of a HACE (HO—PC—OH) on mechanical properties and $T_{flow}$ was studied. In the second series shown in Table II, similarly, PIB-based polyureas was prepared and the effect of two HACEs ($BG_9$ and $EG_9$) was investigated on these parameters.

pated, increasing the hard segment content from 25 to 35% increased the tensile strengths from 31.1 to 58.2 MPa, decreased elongations from 1000 to 740%, and increased flow temperatures from 170 to 230° C. A $T_{flow}$ of 230° C. may be dangerously high for thermal processing due to possible degradation.

In view of the excellent mechanical properties exhibited by Sample C-3, this sample was selected for experimentation aimed at reducing $T_{flow}$. Samples PTMO-1 through PTMO-5 show the effect of the addition of a HACE, a commercially available polycarbonate (HO—PC—OH), relative to that of Sample C-3. In review of the strong H-bond accepting character of the carbonate (—OCO—O—) group, it was believed that even a small amount of this HACE would suffice to disrupt the H-bridges between urea groups and thus bring about thermal proccessability. Indeed, by increasing the amount of HO—PC—OH from 3.2 to 6.3% (see PTMO-1 to PTMO-5) $T_{flow}$ decreased significantly relative to that of Sample C-3, while the tensile strengths remained essentially unchanged. Importantly, $T_{flow/PTMO-5}$ dropped about 53° C. (to 177° C.) relative to that of $T_{flow/C-3}$=230° C., while the mechanical properties remained essentially unchanged (tensile strengths 58.2 and 56.2 MPa).

FIG. 2 depicts tensile strength vs. $T_{flow}$ of PTMO-based polyureas relative to polyurea-urethanes. The $T_{flow}$s of products synthesized with the HACE are significantly lower than those of conventional (no HACE) polyureas, while tensile strengths remain unchanged. According to the $T_{flow}$s of these polyurea-urethanes, they are thermally processable below ~200° C.

TABLE I

Mechanical Properties and Flow Temperatures of Conventional (no HACE) Polyurea-urethanes Compared to those of PTMO-based Polyurea-urethanes

| Sample | Composition | Urethane/urea (mol %/mol %) | Tensile (MPa) | Elongation (%) | $T_{flow}$ (° C.) |
|---|---|---|---|---|---|
| Conventional (no HACE) PTMO-based polyureas | | | | | |
| C-I | $H_2N$-PTM0-$NH_2$(1.1K, 75%)/HMDI + HDA = 25% | 0/100 | 31.1 ± 0.1 | 1000 ± 7 | 171 |
| C-2 | $H_2N$-PTM0-$NH_2$(1.1K, 70%)/HMDI + HAD = 30% | 0/100 | 51.4 ± 1.6 | 849 ± 26 | 183 ± 2 |
| C-3 | $H_2N$-PTM0-$NH_2$(1.1K, 65%)/HMDI + HAD = 35% | 0/100 | 58.2 ± 0.6 | 744 ± 4 | 230 ± 2 |
| PTMO-based HACE-containing polyurea-urethanes | | | | | |
| PTMO-1 | $H_2N$-PTM0-$NH_2$(1.1K, 65%)/HMDI + 5HDA + 1HO-PC-OH (500, 3.2%) = 35% | 7/93 | 55.5 ± 0.1 | 820 ± 11 | 193 |
| PTMO-2 | $H_2N$-PTM0-$NH_2$(1.1K, 65%)/HMDI + 4HDA + 1 HO-PC-OH (500, 3.8%) = 35% | 8/92 | 56.2 ± 1.3 | 770 ± 55 | 203 |
| PTMO-3 | $H_2N$-PTM0-$NH_2$(1.1K, 65%)/HMDI + 3HDA + 1HO-PC-OH (500, 4.5%) = 35% | 10/90 | 58.4 ± 2.4 | 910 ± 36 | 188 |
| PTMO-4 | $H_2N$-PTMO-$NH_2$(1.1K, 65%)/HMDI + 2HDA + 1 HO-PC-OH (500, 5.7%) = 35% | 12/88 | 46.5 ± 3.8 | 910 ± 29 | 169 |
| PTMO-5 | $H_2N$-PTM0-$NH_2$(1.1K, 65%)/HMDI + 3HDA + 1HO-PC-OH (800, 6.3%) = 35% | 9/91 | 56.2 + 0.4 | 866 ± 6 | 177 |

Table I summarizes compositions, mechanical properties and flow temperatures of representative PTMO-based polyurea-urethanes. Samples C-I through C-3 show data obtained with conventional (no HACE) PTMO-based polyureas containing 25, 30 and 35% hard segments. As antici- Table 2 summarizes compositions, urethane/urea ratios, mechanical properties, and $T_{flow}$s of PIB-based polyurea-urethanes prepared with two commercially available polyether-based HACEs, $BG_9$ and $EG_9$. Samples PIB-1 through PIB-6 show products prepared with $BG_9$, and PIB-7 through PIB-9 show those made with EG$_9$. It was decided not to use HO—PC—OH in conjunction with PIB-based polyurethanes or polyureas because that HACE, while giving similar tensile strengths, reduced the elongation by ~50% below that obtained with BG$_9$.

24.2 MPa and 570%, respectively (Sample 3). Tensile strengths remain the same when HDO is replaced with HAD (Sample 4). Significantly, the amount of a HACE that produces the similar tensile strengths is very different. While Sample 3 contains only 5.2% BG$_9$, Sample 4 contains 14%.

TABLE II

Mechanical Properties and Flow Temperatures of PIB-based HACE-containing Polyurea-urethanes

| Sample | Composition | Urethane/ Urea mol %/mol % | Tensile strength (MPa) | Elongation(%) |
|---|---|---|---|---|
| HACE = BG$_9$ | | | | |
| PIB-1 | NH$_2$-PIB-NH$_2$(3.5K, 70%)/HMDI + HDA + BG$_9$(0.65K, 7.5%) = 30% | 17/83 | 13.2 ± 1.9 | 263 ± 30 |
| PIB-2 | NH$_2$-PIB-NH$_2$(3.5K, 70%)/HMDI + HDA + BG$_9$(0.65K, 9.1%) = 30% | 23/77 | 23.3 ± 0.7 | 434 ± 11 |
| PIB-3 | NH$_2$-PIB-NH$_2$(3.5K, 70%)/HMDI + HDA + BG$_9$(0.65K, 11.8%) = 30% | 32/68 | 22.4 ± 0.3 | 557 ± 9 |
| PIB-4[a] | NH$_2$-PIB-NH$_2$(3.5K, 70%)/HMDI + HDA + BG$_9$(0.65K, 14.0%) = 30% | 41/59 | 24.1 ± 0.6 | 671 ± 9 |
| PIB-5 | NH$_2$-PIB-NH$_2$(3.5K, 70%)/HMDI + HDA + BG$_9$(0.65K, 14.4%) = 30% | 43/57 | 23.3 ± 0.1 | 615 ± 7 |
| PIB-6 | NH$_2$-PIB-NH$_2$(3.5K, 70%)/HMDI + BG$_9$(0.65K, 16.1% >= 30% | 55/45 | 22.4 ± 1.1 | 862 ± 42 |
| HACE = EG$_9$ | | | | |
| PIB-7 | NH$_2$-PIB-NH$_2$(3.5K; 70%)/HMDI + HDA + EG$_9$(0.4K, 8.9%) = 30% | 34/66 | 20.1 ± 0.9 | 387 ± 21 |
| PIB-8 | NH,PIB-NH$_2$(3.5K, 70%)/HMDI + HDA + EG$_9$(0.4K,. 10.9%) = 30% | 45/55 | 22.0 ± 0.9 | 521 ± 27 |
| PIB-9 | NH$_2$-PIB-NH$_2$(3.5K, 70%)/HMDI + EG$_9$(0.4K, 13.3%) = 30% | 63/37 | 20.0 ± 0.3 | 710 ± 8 |

*T$_{flow}$ and hardness of PIB-4 are 178° C. and 73 Shore A, respectively.

Products prepared with BG$_9$ yielded better mechanical properties than those with EG$_9$. For example, PIB-4 exhibited 24.1 MPa and 671% tensile strength and elongation, respectively, while PIB-9 gave 22.0 MPa and 521%. The superiority of BG$_9$ may be due to the fact that this HACE is more flexible and thus gives rise to more flexible hard segments than EG$_9$. Flexible hard segments are believed to be fundamental in providing for improved mechanical properties.

FIGS. 3A and 3B show the effect of the BG$_9$ and EG$_9$ concentration on mechanical properties. The figures show a similar trend: increasing HACE concentration, increases tensile strengths and elongations. However, in the absence of the conventional CE (HDA), tensile strengths decreased somewhat (see the last data points in the figures).

Evidently, to obtain optimum mechanical properties the H-donating and H-accepting groups should preferably be balanced. In other words, the number of —NH (donating) groups must preferably balance the number of H-accepting sites (-0-, -0-CO-0-) which include those in the HACE.

The data in Table 3 serve to compare the mechanical properties of a representative PIB-based polyurethane and three polyureas, all containing 30% hard segments by varying the nature of the terminal groups of (HO— or NH$_2$—), the CEs (HDO or HDA), and the amount of HACE (5.2 or 14% BG$_9$). Sample 1 contains only ethane linkages. By changing to urea linkages, i.e., by replacing HO-PIB-OH with NH$_2$-PIB-NH$_2$ (Sample 2), the tensile strength increases from 17.4 to 19.0 MPa and elongation decreases from 480 to 310%. The addition of a few percent of HACE (5.2% BG$_9$) increases both tensile strength and elongation to 24.2 MPa and 570%, respectively (Sample 3). This indicates that a larger amount of HACE is needed to flexibilize, i.e., loosen, the hard segment in the polyurea than in the polyurea-urethane.

TABLE 3

Comparison of mechanical properties of a PIB-based polyurethane and three polyureas prepared with various chain extenders and amounts of HACE.

| | Comparision | Tensile Strength (MPa) | Elongation (%) |
|---|---|---|---|
| 1a | HO-PIB-OH(3.5K, 70%)/HMDI + HDO = 30% | 17.4 | 480 |
| 2a | NH$_2$-PIB-NH$_2$(3.5K, 70%)/HMDI + HDO = 30% | 19.0 | 310 |
| 3a | NH$_2$-PIB-NH$_2$(3.5K, 70%)/HMDI + HDO + BG$_9$(0.65K, 5.2%) = 30% | 24.2 | 570 |
| PIB-4 | NH$_2$-PIB-NH$_2$(3.5K, 70%)/HMDI + HDA + BG$_9$(0.65K, 14.0%) = 30% | 24.1 | 671 |

Figure 4:
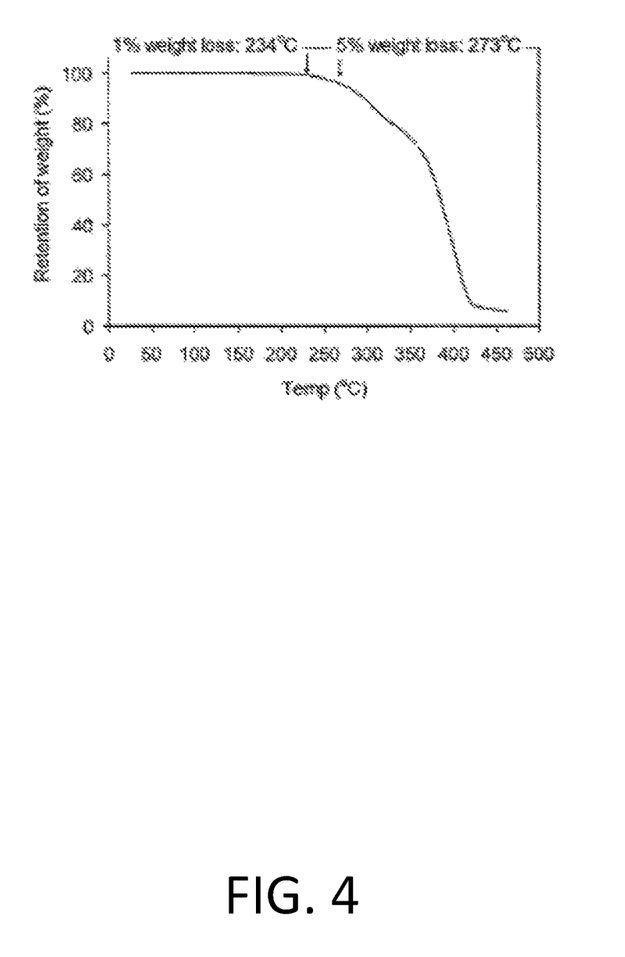
FIG. 4 is a TGA trace of Same PIB-4 in air.

The thermal stability of a representative polyurea-urethane was investigated by TGA. FIG. 4 shows the TGA trace of PIB-4 in air indicating ~1 and ~5% weight loss at ~234 and 273° C., respectively. The trace indicates a two step degradation pattern. The first step at ~270° C. denotes the degradation of urea and/or urethane linkages, while the second step at ~350° C. indicates the degradation of the soft PIB segment. Because the T$_{flow}$ of PIB-4 is 178° C., this polyurea is expected to be thermally processable in the 178 to 234° C. range without degradation.

Figure 5:
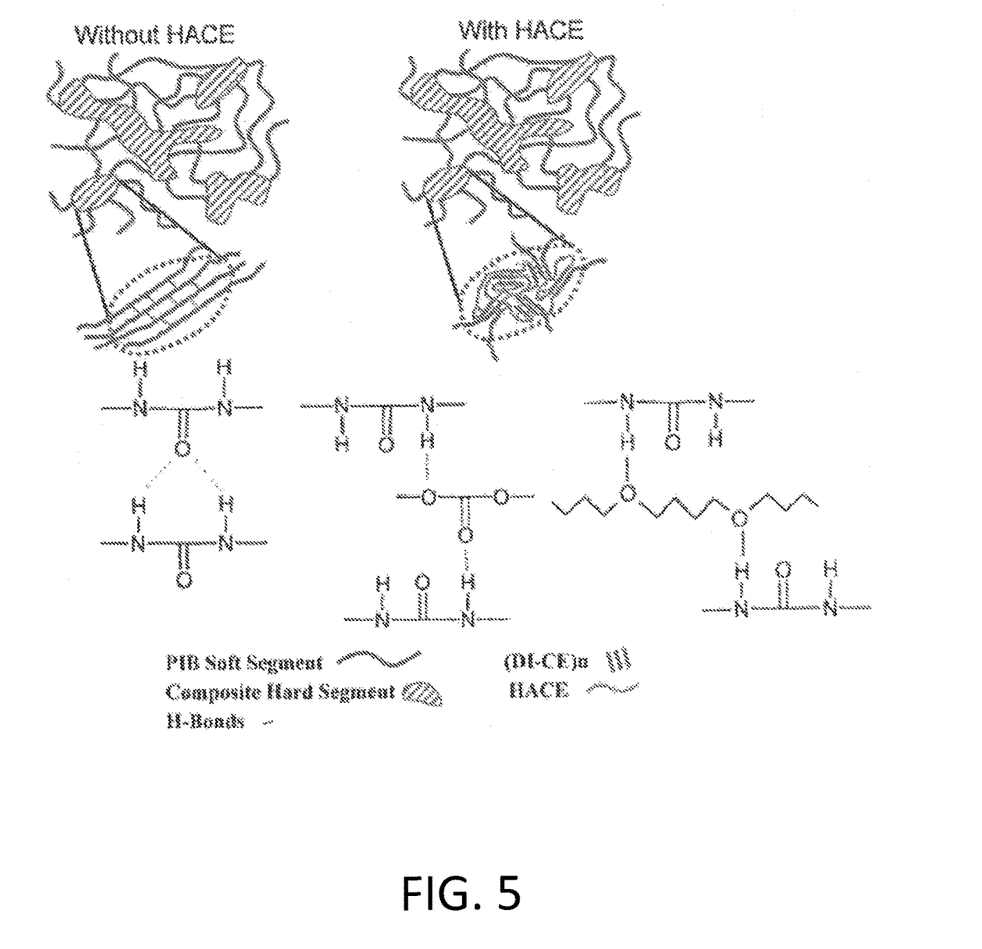
FIG. 5 is a representative idealized micromorphology of conventional (without HACE) polyureas and the HACE-containing polyureas of the present invention.

FIG. 5 shows idealized micromorphologies of polyureas in the absence and presence of HACE. The conventional polyurea (sketch on the left) contains many strong H-bonds between the urea units and consequently its $T_{flow}$ is high, which obviates thermal proccessability. In contrast, the H-bond system in polyureas prepared with polycarbonate- or polyether-based HACE is looser (sketch on the right), which lowers the $T_{flow}$ and leads to thermal proccessability. In the presence of HACEs, H-bonds form not only between the urea groups but also between the urea groups and HACEs, i.e., the HACEs and urea groups compete for H-bonding. The H-bonds due to HACEs help to flexibilize the hard segments, improve mechanical properties, and reduce $T_{flow}$ (impart thermal proccessability).

The chemical structures of PTMO and $BG_9$ are essentially identical except the latter is of much lower molecular weight (1000 g/mol vs 650 g/mol). It was shown that the mechanical properties of polyurethanes do not improve with a HACE whose molecular weight is higher than ~650 g/mol. Although the structures of $BG_9$ and the conventional CE, 1,4-butane diol, are quite similar, the latter (with Mn=90 g/mol) does not improve mechanical properties when used as a HACE and is therefore considered only a CE. At the same hard segment content, 1,4-butane diol produces a larger number of urethane linkages than that of the higher molecular weight $BG_9$. The increased number of urethane linkages produces more H-bonding, which in turn leads to more rigid hard segments, undesirable high phase separation, and thus, to elevated $T_{flow}$. It was suggested that for a HACE to be efficient its molecular weight must be higher than ~150 g/mol.

The role of HACEs is fundamentally different in PTMO- and PIB-based polyureas: whereas, in PTMO-based polyureas, HACEs loosen the strong H-bonding between the urea units and thus decrease $T_{flow}$, in PIB-based polyureas, HACEs flexibilize the hard segments and thus improve mechanical properties.

In light of the foregoing, it should now be evident how polyureas can be rendered melt processable. Heretofore, polyureas were not melt processable because of the presence of strong H bonds in the hard segments which resulted in the thermal degradation of the product upon heating to temperature of 240° C. or more. By adding HACEs to the polyurea groups in the hard segments, either in combination with or separately from conventional CEs, a more flexible hard segment can be attained, or strong H-bond loosened, thus, decreasing $T_{flow}$. It has been found that by the addition of 2 to 15 percent of HACEs to the system in polyureas can redistribute the H-bonding patterns such that the $T_{flow}$ of the elastomer is reduced to about 170 to 200° C., which allows for convenient thermal processing and still maintains excellent mechanical properties similar to those of polyureas produced by solution processing. The beneficial effect of HACEs has been demonstrated with PTMO- and PIB-base polyureas and polyurea-urethanes, both containing at least 30 percent hard segments.

Although the present invention has been described in considerable detail with reference to certain embodiments, other embodiments are possible. Therefore, the spirit and scope of the appended claims should not be limited to the description of the embodiments contained herein.

What is claimed is:

1. A polyurea-urethane elastomer comprising:
   at least one soft segment selected from polyisobutylene and poly(tetramethylene oxide); and
   at least two hard segments, wherein at least one hard segment comprises a plurality of urethane groups and an H-bond accepting chain extender, and wherein at least a second hard segment comprises a plurality of urea groups and a chain extender having a $M_n$ of less than 150 g/mol formed from an aliphatic diamine, an aromatic diamine and a combination of aliphatic and aromatic diamines, wherein the urea groups, the urethane groups, and the H-bond accepting chain extender form H bonds, wherein the H-bond accepting chain extender is formed from a 50 mol % blend of hydroxyl-telechelic poly(hexamethylene carbonate) having a $M_n$ of 800 g/mol mixed with hydroxyl-telechelic poly(pentamethylene carbonate) having a $M_n$ of 500 g/mol; wherein the elastomer is melt processible.

2. The polyurea-urethane elastomer according to claim 1, wherein the hard segment content is at least 30% by weight of the elastomer.

3. The polyurea-urethane elastomer according to claim 2, wherein the hard segment content is at least 35% by weight of the elastomer.

4. The polyurea-urethane elastomer according to claim 1, wherein the H-bond accepting chain extender has more nucleophilic groups than are found in ethylene glycol.

5. The polyurea-urethane elastomer according to claim 1, wherein at least 2 percent by weight of the elastomer of the H-bond accepting chain extender is present.

6. The polyurea-urethane elastomer according to claim 1, wherein the elastomer has a $T_{flow}$ of less than 220° C.

7. The polyurea-urethane elastomer according claim 6, wherein the elastomer has a $T_{flow}$ of less than 200° C.

8. The polyurea-urethane elastomer according claim 6, wherein the elastomer has a $T_{flow}$ of less than 190° C.

9. The polyurea-urethane elastomer according claim 6, wherein the elastomer has a $T_{flow}$ in the range of from 170° C. to 210° C.

* * * * *